United States Patent [19]

Maulat

[11] Patent Number: 5,157,918
[45] Date of Patent: Oct. 27, 1992

[54] TEMPERATURE COMPENSATING DEVICE FOR TURBOSHAFT AERO-ENGINES

[75] Inventor: Jean-Pierre Maulat, St. Maur, France

[73] Assignee: Societe Nationale d'Etude et de Construction de Motors d'Aviation, Paris, France

[21] Appl. No.: 744,433

[22] Filed: Aug. 13, 1991

[30] Foreign Application Priority Data

Aug. 16, 1990 [FR] France .................. 90 10375

[51] Int. Cl.$^5$ ............................................. F02C 9/28
[52] U.S. Cl. .................................. 60/243; 60/39.281
[58] Field of Search .......... 60/233, 238, 243, 39.281

[56] References Cited

U.S. PATENT DOCUMENTS

| | | |
|---|---|---|
| 3,667,218 | 6/1972 | Davis . |
| 3,902,315 | 9/1975 | Martin .................. 60/39.281 |
| 4,314,445 | 2/1982 | Lewis . |
| 4,350,008 | 9/1982 | Zickwolf .................. 60/39.281 |
| 4,627,234 | 12/1986 | Schuh .................. 60/39.281 |
| 4,910,956 | 3/1990 | Legore et al. .................. 60/39.281 |

FOREIGN PATENT DOCUMENTS 2173143 10/1973 France .

*Primary Examiner*—Louis J. Casaregola
*Attorney, Agent, or Firm*—Oblon, Spivak, McClelland, Maier & Neustadt

[57] ABSTRACT

A compensating device for the temperature in front of the high pressure turbine of a compound turboshaft aero-engine which is regulated to a designated constant temperature behind the low pressure turbine is provided with a function generator which supplies a correction value signal for the designated temperature as a function of the rotational speed of the low pressure turbine and of the actual temperature at the outlet of the said turbine. The device is activated as soon as the rotational speed of the high pressure turbine goes below 80% of its maximum rated speed and is operative to apply the correction value signal to the designated temperature for a predetermined time as soon as the rotational speed of the high pressure turbine goes above 90% of its maximum rated speed while the device is activated.

7 Claims, 2 Drawing Sheets

TEMPERATURE COMPENSATING DEVICE FOR TURBOSHAFT AERO-ENGINES

BACKGROUND OF THE INVENTION

1. Field of the Invention

The present invention relates to the control of a turboshaft aero-engine, and more particularly to a compensating device for the temperature in front of the high pressure turbine of a compound turboshaft engine which comprises high and low pressure units and includes a control system for regulating the engine to a desired constant temperature behind the low pressure turbine, the device being intended to increase automatically and temporarily the thrust of the engine in poor flight conditions, especially at high ambient temperatures and when the engine is cold.

2. Summary of the Prior Art

In a turboshaft engine regulated to a constant after turbine temperature, thrust is normally at a maximum when the pilot sets the engine control system to full throttle. However, a lack of thrust is observed when the engine is cold and/or when the ambient temperature is high. This occurs in Particular on take-off and during landing approach stages, i.e. at the time when the pilot needs maximum thrust. This lack of thrust is due to the fact that the temperature is insufficient in front of the turbine when applying the engine power, and this temperature deficiency in front of the turbine is all the greater when the ambient temperature is high or the engine is cold.

A gas turbine control device is known which enables the desired temperature value to be rectified when ambient temperature is high. FR-A-2 173 143 describes such a control installation which comprises a function generator, shown in detail in FIG. 3 of the said document, providing a correction rule which is a function of the ratio of the rotational speed of the gas turbine to the square root of the ambient temperature. The drawback with this system is that it does not take into account the thermal condition of the engine as the power applied is increased, which is particularly important for an aircraft at the take-off stage when the engine is still cold.

SUMMARY OF THE INVENTION

It is an object of the present invention to provide a compensation device of the type described above which is integrated in the engine control system, and which effects an automatic improvement in the thrust of the engine when the latter is cold and/or when ambient temperature is high.

To this end, according to the invention such a compensator device comprises:

a function generator;

means for supplying a first signal to said function generator corresponding to the rotational speed of said low pressure turbine;

means for supplying a second signal to said function generator corresponding to the actual temperature at the outlet of said low pressure turbine;

said function generator being arranged to provide an output signal representing a correction value for the designated after turbine temperature as a function of said first and second signals and in accordance with a predetermined program;

an adder;

means for supplying a signal to said adder corresponding to a given designated after turbine temperature; and means for temporarily connecting said function generator to said adder in order to supply said correction value signal to said adder depending on the working conditions of said engine, whereby said adder is connected to said control system to supply thereto either said given designated temperature signal or a corrected designated temperature signal formed by the combination of said given designated temperature signal and said correction value signal.

Preferably the means for temporarily connecting the function generator to the adder comprises:

a switch disposed in a connection between said function generator and said adder;

a timer for closing said switch for a predetermined length of time when said timer is triggered;

a first sensor responsive to the rotational speed of said high pressure turbine to provide a signal when said rotational speed is greater than a first predetermined percentage of the maximum rated speed of said high pressure turbine, a second sensor responsive to the rotational speed of said high pressure turbine to provide a signal when said rotational speed is below a second predetermined percentage of said maximum rated speed of said high pressure turbine, said second predetermined percentage being lower than said first predetermined percentage;

a memory connected to said second sensor and activated in response to said signal generated by said second sensor; and an And gate having a first input connected to receive said signal generated by said first sensor, a second input connected to receive a signal from said memory when said memory is activated, and an output connected to said timer whereby said timer is triggered when said And gate receives signals simultaneously from said first sensor and said memory;

said timer being connected to said memory whereby said memory is deactivated when said timer is triggered.

Preferably, the first sensor provides a signal when the rotational speed of the high pressure turbine unit is in excess of 90% of its maximum rated speed, which takes place when the pilot turns the engine control system to full power, and the second sensor preferably provides the memory activation signal when the rotational speed of the high pressure unit is below 80% of its maximum rated speed. This low speed level seldom occurs when the aircraft is cruising, but is obtained during the landing approach stages.

The device in accordance with the invention enables the thrust of the engine to be increased automatically in poor flight conditions, as it takes into account both mechanical and thermal parameters of the engine. The program of the function generator is worked out in such a way that the function generator provides a correction value signal which is between a maximum limit value corresponding to the most unfavourable flight conditions, so as to prevent overheating of the engine, and a zero value corresponding to the optimum operational conditions of the engine at high speed.

On take-off, the system will become active from the initial acceleration of the engine, and the designated temperature will be adjusted by the compensating signal for a predetermined time as soon as the rotational speed of the high pressure unit of the turboshaft engine becomes equal to, or greater than, 90% of its maximum rated speed. The device will be subsequently reactivated in flight only in exceptional circumstances, since the rotational speed of the high pressure unit rarely falls below the 80% threshold set for its priming. During the approach phase or on landing, however, the device will again become operational as soon as the rotational speed of the high pressure unit falls below 80% of its maximum rated speed.

During "touch and go" exercises, the operational conditions of the device are identical to the conditions during approach and landing.

Other advantages and characteristics of the invention will become apparent from the following description of a preferred embodiment and with reference to the attached drawings.

DESCRIPTION OF THE PREFERRED EMBODIMENT

Figure 1:
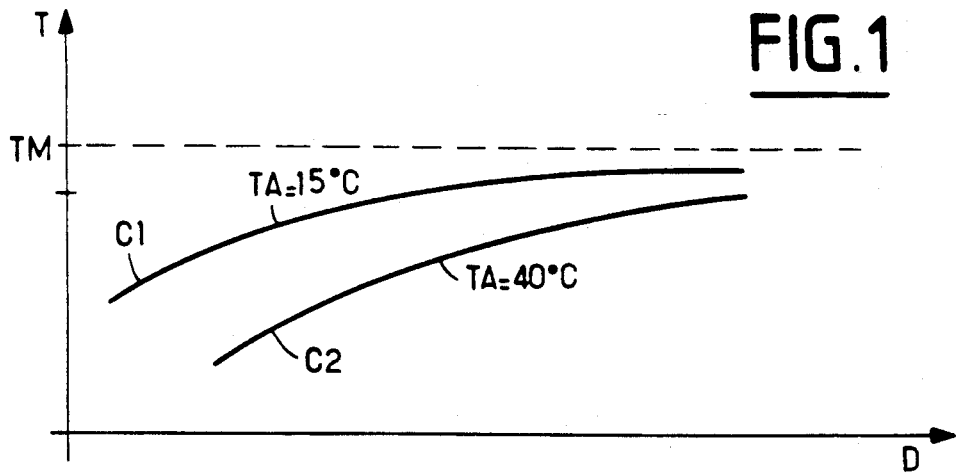
FIG. 1 shows curves plotting the temperature T in front of the turbine in a turboshaft engine regulated to a constant after turbine temperature as a function of the duration D of the engine warm-up for different ambient temperatures TA.

When increasing the power of a compound turboshaft aero-engine of the twin-unit type, regulated to a constant designated temperature T7 behind the low pressure turbine, some time is needed for the temperature T in front of the turbines to become stabilized at its maximum value TM. FIG. 1 shows curves C1 and C2 plotting this temperature T as a function of the time D which has elapsed during the warming-up of the engine. Curve C1 corresponds to an ambient temperature TA of 15° C. and curve C2 corresponds to an ambient temperature TA of 40° C. These curves C1 and C2 show that the lack of temperature in front of the turbine, i.e. the gap between TM and T, is much greater as the ambient temperature TA is higher, and this lack of temperature reduces as the time D increases. This lack of temperature brings about a reduction of engine thrust when the ambient temperature TA is high and when the engine is cold. This unfavourable situation occurs in particular on take-off and on approach or landing, in other words at the very times when it is necessary to be able to obtain maximum thrust.

The invention provides an automatic device which is integrated into the engine control system and which, without requiring the pilot's intervention and without special control equipment, acts to increase the temperature T in front of the turbine for a predetermined length of time, and as a function of flight conditions, so as to improve the thrust of the engine during this predetermined length of time.

The principle of the invention lies in increasing temporarily the designated after turbine temperature T7 in accordance with a pre-established program over the predetermined length of time.

Figure 2:
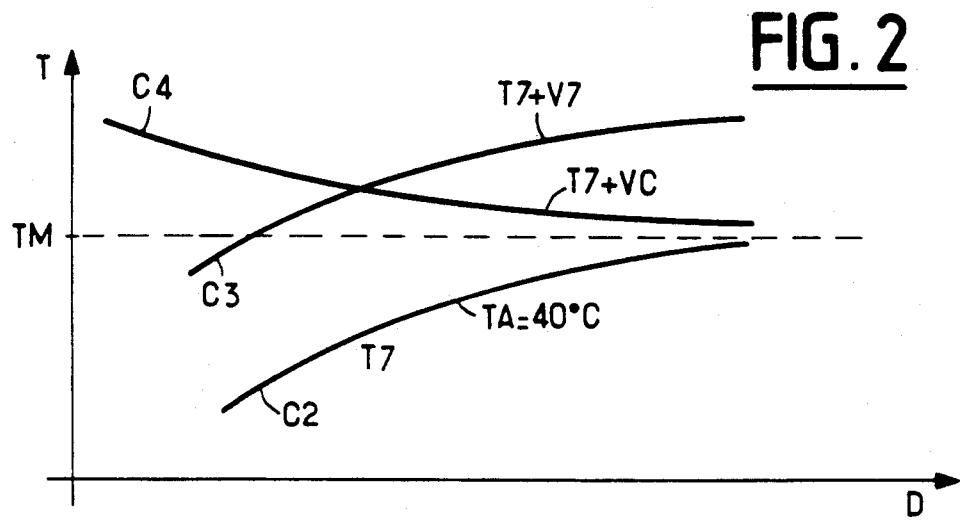
FIG. 2 shows curves plotting the temperature T in front of the turbine as a function of the warm-up duration D, for a given ambient temperature and for different designated temperatures behind the turbine.

In FIG. 2 there is again shown the curve C2 plotting the temperature T in front of the turbine as a function of the warm-up time D for an ambient temperature TA equal to 40° C. and a given constant designated after turbine temperature T7. The curve C3 represents the temperature T in front of the turbine which is obtained by increasing the designated after turbine temperature T7 by a constant value V7. A temperature T is then obtained which is clearly above the maximum temperature TM, which may lead to dangerous overheating of the turboshaft engine. The curve C4 is obtained using a program which is designed to increase the designated after turbine temperature T7 by a correction value VC. This correction value has a maximum limit value VCM under the most unfavourable conditions in order to prevent overheating of the engine, but is otherwise a function of the kinematic and thermal parameters of the turbines and decreases progressively as the optimum values of these parameters at full speed are approached. The selected parameters are the rotational speed NBP of the low pressure turbine and the effective temperature TE7 at the outlet of the low pressure turbine.

Figure 3:
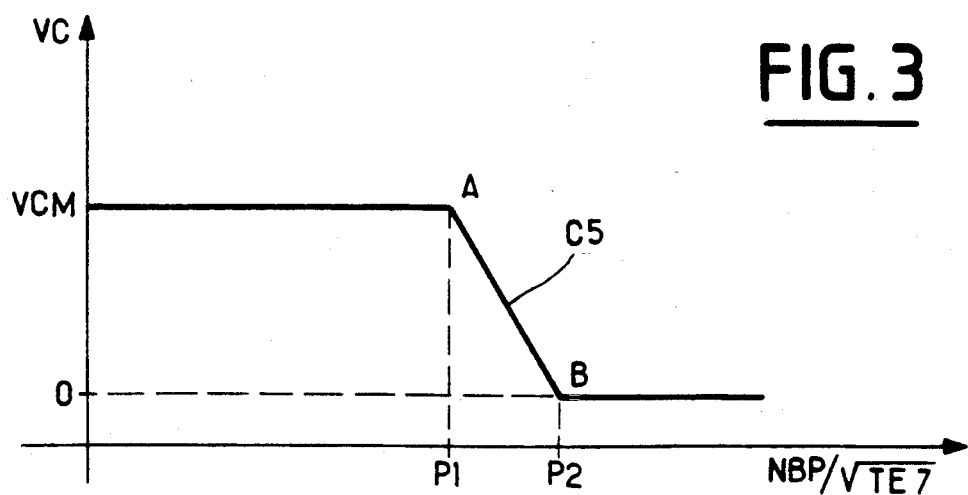
FIG. 3 shows a curve representing the program giving the correction value VC for the designated temperature as a function of the rotational speed NBP of the low pressure turbine and of the actual temperature TE7 behind the said turbine.

FIG. 3 shows a curve C5 representing graphically the correction value VC as a function of a parameter P proportional to the rotational speed NBP and inversely proportional to the square root of the actual temperature TE7 at the outlet of the low pressure turbine. The curve C5 shows that, up to a value P1 of the parameter P, the correction value VC to be applied is constant and equal to VCM. This corresponds to a cold engine. After reaching the point P1 the correction value VC decreases progressively until point P2, which corresponds to a hot engine and to the ideal operational conditions of the engine, the temperatures being stabilized. After the point P2 the correction value VC is thus equal to 0.

Figure 4:
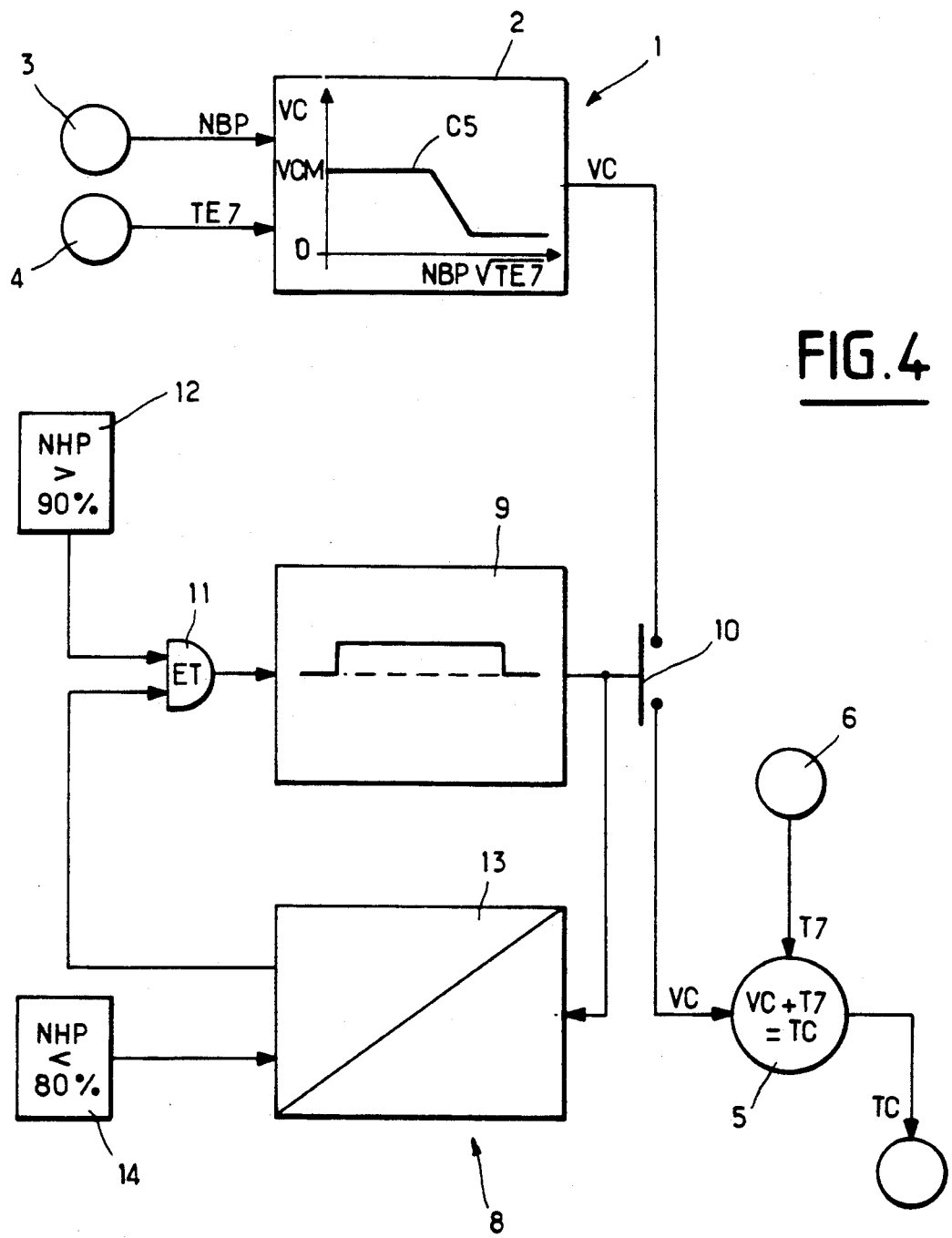
FIG. 4 shows a block diagram of an embodiment of the device in accordance with the invention.

FIG. 4 shows a block diagram of a device 1 in accordance with the invention for providing automatic compensation of the temperature at the inlet of the turbine under poor flight conditions.

The device 1 essentially comprises a function generator 2 which receives signals representing the rotational speed NBP of the low pressure turbine and the actual temperature TE7 at the outlet of the low pressure turbine, and which supplies an output signal representing a temperature correction value VC which is a function of the program represented by the curve C5 of FIG. 3. The rotational speed NBP of the low pressure turbine is sensed by a rotational speedometer 3, and the temperature at the outlet of the low pressure turbine is measured by a temperature sensor 4. The correction value VC obtained is supplied, under certain conditions of operation of the turboshaft engine which will be explained below, to an adder 5 which also receives an input from a device 6 providing a signal representing the value of the normal designated after turbine temperature T7 governing the control system of the engine. The adder 5 is thus able to provide an output signal corresponding to a corrected designated temperature value TC for governing the control system of the engine.

The device 1 further comprises means 8 for permitting the supply of the correction value signal VC to the adder 5 under certain conditions of operation of the aircraft, particularly on take-off and during the approach and landing stages.

These means 8 essentially comprise a timer 9 which operates a switch 10 to close a connection between the function generator 2 and the adder 5 for a predetermined period, which may be, for example, 150 seconds, thus enabling the adder to receive the correction value signal VC generated by the function generator 2 during the predetermined period.

The timer 9 is triggered by an AND gate 11 which has one of its inputs connected to a first speed sensor 12 which provides a signal when the rotational speed of the high pressure unit NHP is above 90% of its maximum rated speed, and the other of its inputs connected to a memory 13 which provides a signal when it is activated. The memory 13 is connected to a second speed sensor 14 which provides a signal to activate the memory 13 when the rotational speed of the high pressure unit is below 80% of the maximum rated speed. The memory 13 is also connected to the output of the timer 9 so that the memory 13 is deactivated when the timer 9 is triggered.

As a result of this arrangement the device 1 is activated when the rotational speed of the high pressure unit NHP is below 80% of its maximum rated speed and remains activated until the timer 9 is triggered, which occurs when the rotational speed of the high pressure unit NHP increases to above 90% of its maximum rating. The device 1 is thus operational from the very moment of the first increase in speed of the turboshaft engine, which occurs when the aircraft takes off, and operates until the end of the period set by the timer. During cruising the device 1 remains generally inoperative as the rotational speed of the high pressure unit NHP only rarely falls below 80% of its maximum rated speed. On approaching an aerodrome, the device will be reactivated when the rotational speed of the high pressure unit NHP falls below the 80% threshold, and will start working as soon as the pilot again opens the throttle and the rotational speed of the high pressure unit NHP increases to more than 90% of its maximum rating.

It will be noted that when the timer 9 is not triggered the designated temperature signal TC provided by the adder 5 is equal to the normal designated temperature T7. Moreover, if flight conditions are favourable, i.e. if the ambient temperature TA is low and the engine hot, the correction value signal VC provided by the function generator 2 is zero.

I claim:

1. In a compound turboshaft aero-engine including a high pressure turbine, a low pressure turbine, and a control system for regulating the engine to a designated constant temperature behind said low pressure turbine, a compensator device for the temperature in front of said high pressure turbine for automatically increasing temporarily the thrust of said engine in poor flight conditions, especially at high ambient temperatures and when the engine is cold, said device comprising:
    a function generator;
    means for supplying a first signal to said function generator corresponding to the rotational speed of said low pressure turbine;
    means for supplying a second signal to said function generator corresponding to the actual temperature at the outlet of said low pressure turbine;
    said function generator being arranged to provide an output signal representing a correction value for said designated temperature as a function of said first and second signals and in accordance with a predetermined program;
    an adder;
    means for supplying a signal to said adder corresponding to a given designated temperature; and
    means for temporarily connecting said function generator to said adder in order to supply said correction value signal to said adder depending on the working conditions of said engine, whereby said adder is connected to said control system to supply thereto either said given designated temperature signal or a corrected designated temperature signal formed by the combination of said given designated temperature signal and said correction value signal.

2. A compensator device according to claim 1, wherein said means for temporarily connecting said function generator to said adder comprises:
    a switch disposed in a connection between said function generator and said adder;
    a timer for closing said switch for a predetermined length of time when said timer is triggered;
    a first sensor responsive to the rotational speed of said high pressure turbine to provide a signal when said rotational speed is greater than a first predetermined percentage of the maximum rated speed of said high pressure turbine,
    a second sensor responsive to the rotational speed of said high pressure turbine to provide a signal when said rotational speed is below a second predetermined percentage of said maximum rated speed of said high pressure turbine, said second predetermined percentage being lower than said first predetermined percentage;
    a memory connected to said second sensor and activated in response to said signal generated by said second sensor; and
    an And gate having a first input connected to receive said signal generated by said first sensor, a second input connected to receive a signal from said memory when said memory is activated, and an output connected to said timer whereby said timer is triggered when said And gate receives signals simultaneously from said first sensor and said memory;
    said timer being connected to said memory whereby said memory is deactivated when said timer is triggered.

3. A compensator device according to claim 2, wherein said first sensor provides a signal when the rotational speed of said high pressure turbine is greater than 90% of said maximum rated speed thereof.

4. A compensator device according to claim 2, wherein said second sensor provides an activation signal to said memory when the rotational speed of said high pressure turbine is lower than 80% of said maximum rated speed thereof.

5. A compensator device according to claim 2, wherein said timer is arranged to close said switch for a period of about 150 seconds.

6. A compensator device according to claim 1, wherein said correction value signal generated by said function generator has a maximum limit value governed by said program.

7. A compensator device according to claim 6, wherein said maximum limit value corresponds to about 15° C.

* * * * *